(12) United States Patent
Kim et al.

(10) Patent No.: US 9,303,130 B2
(45) Date of Patent: Apr. 5, 2016

(54) NANOCOMPOSITES, POLYMER COMPOSITIONS COMPRISING THE SAME AND PREPARATION METHODS THEREOF

(75) Inventors: No Ma Kim, Daejeon (KR); Bong Keun Lee, Daejeon (KR); Suk Ky Chang, Daejeon (KR); Jae Gwan Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 619 days.

(21) Appl. No.: 12/743,183

(22) PCT Filed: Nov. 20, 2008

(86) PCT No.: PCT/KR2008/006848
§ 371 (c)(1),
(2), (4) Date: Aug. 23, 2010

(87) PCT Pub. No.: WO2009/066942
PCT Pub. Date: May 28, 2009

(65) Prior Publication Data
US 2011/0033695 A1    Feb. 10, 2011

(30) Foreign Application Priority Data
Nov. 21, 2007  (KR) .................. 10-2007-0119238

(51) Int. Cl.
| C08K 3/34 | (2006.01) |
| C08J 5/00 | (2006.01) |
| B82Y 30/00 | (2011.01) |
| C08L 33/06 | (2006.01) |
| C08L 39/04 | (2006.01) |

(52) U.S. Cl.
CPC ............... *C08J 5/005* (2013.01); *B82Y 30/00* (2013.01); *C08J 2325/18* (2013.01); *C08K 3/346* (2013.01); *C08L 33/068* (2013.01); *C08L 39/04* (2013.01); *Y10T 428/26* (2015.01)

(58) Field of Classification Search
USPC .......... 524/530, 445, 556, 531; 526/258, 266, 526/307.8, 317.1, 320; 977/832, 788
See application file for complete search history.

(56) References Cited

U.S. PATENT DOCUMENTS

| 3,252,757 A | 5/1966 | Granquist |
| 3,666,407 A | 5/1972 | Orlemann |
| 3,671,190 A | 6/1972 | Neumann |
| 3,844,978 A | 10/1974 | Hickson |
| 3,844,979 A | 10/1974 | Hickson |
| 3,852,405 A | 12/1974 | Granquist |

(Continued)

FOREIGN PATENT DOCUMENTS

| CN | 101020776 A | 8/2007 |
| EP | 1 801 158 A1 | 6/2007 |

(Continued)

*Primary Examiner* — Satya Sastri
(74) *Attorney, Agent, or Firm* — Dentons US LLP (57) ABSTRACT

Provided are a nanocomposite including a layered inorganic material and a random copolymer containing a hydrophobic monomer and a hydrophilic monomer, a polymer composition including the nanocomposite, and a method for preparing the polymer composition. The random copolymer can be prepared at a low cost in a simple process and function as a compatibilizer in small amounts to maintain excellent properties of the nanocomposite including excellent mechanical characteristics such as abrasion resistance, hardness, tensile modulus and tear resistance, excellent thermal characteristics, high liquid and gas permeability, and low flammability.

15 Claims, 2 Drawing Sheets (56) References Cited

U.S. PATENT DOCUMENTS

| | | | |
|---|---|---|---|
| 3,855,147 A | 12/1974 | Granquist | |
| 6,051,643 A * | 4/2000 | Hasegawa et al. | 524/445 |
| 6,117,932 A * | 9/2000 | Hasegawa et al. | 524/445 |
| 6,770,697 B2 * | 8/2004 | Drewniak et al. | 524/445 |
| 6,858,665 B2 * | 2/2005 | Larson | 524/445 |
| 7,015,398 B2 | 3/2006 | Vexler et al. | |
| 7,037,562 B2 | 5/2006 | Jimenez | |
| 2002/0137833 A1 * | 9/2002 | Loontjens et al. | 524/445 |
| 2003/0144401 A1 * | 7/2003 | Ajbani et al. | 524/445 |
| 2005/0014905 A1 | 1/2005 | Chung et al. | |
| 2006/0036390 A1 | 2/2006 | Loh et al. | |
| 2006/0074167 A1 | 4/2006 | Nelson et al. | |
| 2006/0111499 A1 | 5/2006 | Kim et al. | |
| 2007/0055793 A1 | 3/2007 | Huang et al. | |

FOREIGN PATENT DOCUMENTS

| | | |
|---|---|---|
| JP | 64-009202 A | 1/1989 |
| JP | 05-039392 A | 2/1993 |
| JP | 08-259616 A | 10/1996 |
| JP | 11-092594 | 4/1999 |
| JP | 2000-129078 A | 5/2000 |
| JP | 2001-302710 A | 10/2001 |
| JP | 2002-338775 A | 11/2002 |
| JP | 2005-307192 A | 11/2005 |
| JP | 2006-291067 A | 10/2006 |
| JP | 2007-169634 A | 7/2007 |
| JP | 2007-246878 A | 9/2007 |
| TW | 411360 B | 11/2000 |
| TW | I251606 B | 3/2006 |
| WO | WO 2006/036390 A1 | 4/2006 |
| WO | WO 2007/055793 | 5/2007 |
| WO | WO 2008/070407 A2 | 6/2008 |

* cited by examiner

NANOCOMPOSITES, POLYMER COMPOSITIONS COMPRISING THE SAME AND PREPARATION METHODS THEREOF

This application is a National Stage Entry of International Application No. PCT/KR2008/006848, filed Nov. 20, 2008, and claims the benefit of Korean Application No. 10-2007-0119238, filed on Nov. 21, 2007, which is hereby incorporated by reference for all purposes as if fully set forth herein.

TECHNICAL FIELD

The present invention relates to a nanocomposite comprising a layered inorganic material and a random copolymer containing a hydrophobic monomer and a hydrophilic monomer, a polymer composition comprising the nanocomposite, and a method for preparing a polymer composition.

BACKGROUND ART

While interest in nano technology has been increasing since the 1990s, research on nanocomposites has also been actively progressing. Nanocomposite means a composite, in which fillers having a size of 1 to 100 nm such as polymers, inorganic materials and/or metal particles are uniformly dispersed in a polymer matrix.

Nanocomposites have significantly improved or novel characteristics compared to conventional polymer compounds having particles with a size of 1 to 100 μm dispersed therein, owing to very large surface areas (interface areas) of elements contained therein and significantly reduced distances between particles. Since nanocomposites have advantages including greatly improved thermal and mechanical characteristics, high liquid and gas permeability and low flammability even by addition of only a small amount of dispersion particles, as compared to conventional inorganic fillers or reinforcing agents, they have attracted the attention of researchers and companies.

Nano-scale particles (fillers or reinforcing agents) widely used in the manufacture of nanocomposites include a layered silicate (ex. phyllosilicate). The nanocomposite is generally manufactured by preparing an additive with high purity by purifying or synthesizing a layered silicate, pretreating the additive so as to be well dispersed in a polymer resin, and mixing the pretreated additive with the polymer resin.

In the manufacture of the nanocomposite, the most important part is uniform dispersion of the nano-scale additive such as the layered silicate in the resin. In order to achieve the uniform dispersion, various techniques have been suggested.

European Patent No. 1801158 discloses a method of preparing a natural or synthetic clay compound intercalated and/or exfoliated using a block copolymer having a latex form, in which a diblock copolymer of 4-vinylpyridine and styrene is used as the block copolymer. In addition, U.S. Patent Publication No. 2006-74167 discloses a nanocomposite including a layered silicate and a block copolymer compatible with the silicate, in which a diblock copolymer of styrene and 4-vinylpyridine is also used as the block copolymer.

All of the above-mentioned prior techniques use a block copolymer including specific monomers as an exfoliating compatibilizer that is inserted between layers of the silicate. However, the block copolymer is difficult to efficiently prepare because of a very complicated and costly preparation process. Accordingly, the techniques disclosed in these prior documents are difficult to commercialize as they are hardly compatible with actual nanocomposite preparation processes.

DISCLOSURE

Technical Problem

The present invention is directed to providing a nanocomposite prepared using a random copolymer that can be prepared at a low cost by a very simple method, and having excellent properties including improved mechanical and thermal characteristics, high liquid and gas permeability and low flammability, a polymer composition including the nanocomposite, and a method of preparing the polymer composition.

Technical Solution

One aspect of the present invention provides a nanocomposite, comprising: a layered inorganic material; and a random copolymer containing a hydrophobic monomer and a hydrophilic monomer.

Another aspect of the present invention provides a polymer composition comprising a polymer resin and the nanocomposite according to the present invention. Still another aspect of the present invention provides a method for preparing a polymer composition, comprising a step of preparing a nanocomposite by mixing a layered inorganic material and a random copolymer containing a hydrophilic monomer and a hydrophobic monomer; and a step of mixing the nanocomposite and a polymer resin.

Advantageous Effects

The present invention provides a nanocomposite capable of imparting excellent mechanical and thermal characteristics, high liquid and gas permeability, and low flammability to a polymer composition even in small amounts, since the nanocomposite comprises a layered inorganic material and a random copolymer can be prepared at a low cost in a simple process. The present invention also provides a polymer composition comprising the same and a preparation method thereof.

BEST MODE

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

The present invention relates to a nanocomposite comprising a layered inorganic material and a random copolymer containing a hydrophobic monomer and a hydrophilic monomer. In the nanocomposite, the layered inorganic material has a high degree of exfoliation due to the random copolymer having the monomers whose reactivity ratios have a big difference. Accordingly, since the nanocomposite of the present invention has an excellent dispersion characteristic, when it is added to a polymer, it may also exhibit excellent properties including excellent mechanical and thermal characteristics, high liquid and gas permeability and low flammability, even in small amounts.

Hereinafter, the nanocomposite of the present invention will be described in more detail.

The term "nanocomposite" refers to a material including nano-scale inorganic material uniformly dispersed in a resin. Here, the kind of the layered inorganic material included in the nanocomposite is not particularly limited and may include clay minerals such as layered silicate (ex. Phyllosilicate). The layered silicate is an inorganic compound in which sheet-type silicates composed of silicon, aluminum, magnesium and oxygen are piled up. In the present invention, each platelet comprised in the layered silicate may have a thickness of 0.5 to 5 nm, a length of 25 to 2000 nm, and an aspect ratio of 50 to 2000, but these dimensions are not particularly limited. The term "platelet" refers to each layer constituting a layered silicate, and when the dimensions of the platelet fall outside of the ranges above, it is apprehended that properties of the nanocomposite is degraded.

The layered inorganic materials are preferably intercalated or exfoliated by a random copolymer to be described later in the nanocomposites of the present invention. Accordingly, dispersion and miscibility of the platelets of the layered silicate into a polymer resin may be improved. The term "intercalation" used herein describes a state in which the platelets constituting the inorganic material expand and crack apart from each other, and the term "exfoliation" describes a state in which the platelets completely separate and are dispersed at a nanoscale level. To be specific, a gap between the platelets of the layered inorganic material of the present invention may be 1 nm or more, and preferably, 3 nm or more. When the gap between the platelets is less than 1 nm, it is apprehended that dispersion and miscibility in the nanocomposite is decreased.

The layered silicate may be easily obtained from nature or synthesized from silica, and the like, and its kind and properties such as purity in synthesis may be easily controlled. The kind of the layered silicate available for the present invention is not particularly limited, and thus any silicate, for example, a natural or synthetic layered silicate or an organically modified layered silicate such as an organoclay, can be used if it satisfies the above conditions.

The natural or synthetic layered silicate may include mica, fluoromica, pyrophyllite, glauconite, vermiculite, sepiolite, allophone, imogolite, talc, illite, sobockite, svinfordite, kaolinite, dickite, nacrite, anauxite, sericite, ledikite, montronite, metahalloysite, serpentine clay, chrysotile, antigorite, attapulgite, palygorskite, Kibushi clay, gairome clay, hisingerite, chlorite, montmorillonite, sodium montmorillonite, magnesium, montmorillonite, calcium montmorillonite, nontronite, bentonite, beidellite, hectorite, sodium hectorite, saponite, sauconite, fluorohectorite, stevensite, volkonskoite, magadiite, kenyaite, halloysite, hydrotalcite, smectite, and a smectite-type layered silicate, but it is not limited thereto. The layered silicate may be obtained from nature in a natural type or synthesized by a common method known in the art. The present invention may also include layered silicates synthesized by a hydrothermal process disclosed in U.S. Pat. Nos. 3,252,757, 3,666,407, 3,671,190, 3,844,978, 3,844,979, 3,852,405 and 3,855,147, and most of the common layered silicates known in the art, which are also commercially available under the names of Laponite (Southern Clay Product), Laponite D (Southern Clay Product) and Laponite RD (Southern Clay Product).

Considering compatibility with the random copolymer and/or polymer resin to be described later, an organoclay prepared by organically modifying one of these layered silicates is preferable for the present invention, which however is not limited thereto. The organoclay refers to smectite or smectite-type clay prepared by treating unfunctionalized clay with at least one intercalant. Here, the intercalant may be generally a neutral or ionic organic compound. The neutral organic compound may be a monomeric, oligomeric or polymeric compound of a polar compound such as an amide, ester, lactam, nitrile, urea, carbonate, phosphate, phosphonate, sulfate, sulfonate or nitro compound. The neutral organic compound may be interposed between layers of the clay through hydrogen bond without completely substitute a charge balancing ion of the clay. The ionic organic compound may be an onium compound such as primary, secondary, tertiary or quaternary ammonium, phosphonium, a sulfonium derivative, aromatic or aliphatic amine, phosphine or sulfide; or a cationic surfactant such as an onium ion, for example, a quaternary ammonium ion having at least one long-chain aliphatic group (ex. octadecyl, miristyl or oleyl) bonded to a quaternary nitrogen atom. These organoclays are distributed under the names of Cloisite (Southern Clay Product; induced from layered magnesium aluminum silicate; e.g., Cloisite 6A, Cloisite 15A and Cloisite 20A), Claytone (Southern Clay Product; induced from natural sodium bentonite; e.g., Claytone HY and Claytone AF) and Nanomer (Nanocor).

In the present invention, the nanocomposite comprises a random copolymer containing a hydrophobic monomer and a hydrophilic monomer with the layered inorganic material described above. Here, the hydrophilic and/or hydrophobic monomer(s) included in the copolymer has an affinity with the layered inorganic material, and thus the copolymer is inserted between the platelets of the layered inorganic material so as to expand or exfoliate it.

In the random copolymer of the present invention, a reactivity ratio ($r_1$) of the hydrophilic monomer represented by Formula (1) and a reactivity ratio ($r_2$) of the hydrophobic monomer represented by Formula (2) may satisfy the relationships given by Formulae (3) and (4), but the present invention is not limited thereto.

$$r_1 = k_{11}/k_{12} \quad \text{Formula (1)}$$

$$r_2 = k_{22}/k_{21} \quad \text{Formula (2)}$$

$$r_1 - r_2 \geq 0.5 \quad \text{Formula (3)}$$

$$[r_1 > 1 \text{ and } r_2 < 1] \text{ or } [r_1 < 1 \text{ and } r_2 > 1] \quad \text{Formula (4)}$$

In Formulae (1) and (2), $k_{11}$ is a reaction rate constant of a hydrophilic radical (M1.) and a hydrophilic monomer ($M_1$), $k_{12}$ is a reaction rate constant of a hydrophilic radical ($M_1$. and a hydrophobic monomer ($M_2$), $k_{21}$ is a reaction rate constant of a hydrophobic radical ($M_2$. and a hydrophilic monomer ($M_1$), and $k_{22}$ is a reaction rate constant of a hydrophobic radical ($M_2$. and a hydrophobic monomer ($M_1$).

If the difference in reactivity ratio (Formula (3)) of the monomer included in the random copolymer of the present invention is less than 0.5, the reactivity of the hydrophobic monomer is so high that miscibility of the copolymer to an inorganic material may be degraded.

The present invention may use any hydrophobic or hydrophilic monomer generally known in the art without limitation, if it satisfies the above conditions.

The hydrophobic monomer may include ethylenically unsaturated hydrocarbon such as propylene, isoprene, styrene, or butadiene; siloxane such as decamethylcyclopentasiloxane or decamethyltetrasiloxane; halogenated olefin such as difluoroethylene, trifluoroethylene, tetrafluoroethylene, chlorofluoroethylene or hexafluoropropylene; or alkyl (meth) acrylate such as butyl (meth)acrylate, isooctyl (meth)acrylate, lauryl (meth)acrylate or stearyl (meth)acrylate, and preferably, ethylenically unsaturated hydrocarbon such as styrene.

The hydrophilic monomer may include monomer capable of introducing a hydrophilic unit such as an acidic group such as —$CO_2H$, —$SO_3H$ or —$PO_3H$; —OH; —SH; primary, secondary or tertiary amine; ammonium N-substituted or unsubstituted amide or lactam; N-substituted or unsubstituted thioamide or thiolactam; anhydride; linear or cyclic ether or polyether; isocyanate; cyanate; nitrile; carbarmate; urea; or thiourea or hetrocyclic amine such as pyridine or imidazole to the copolymer. The hydrophilic monomer may include at least one selected from the group consisting of (meth)acrylic acid, itaconic acid, maleic acid, fumaric acid, (meth)acrylate containing a hydrophilic functional group such as 2-hydroxyethyl (meth)acrylate; (meth)acrylamide; amine or amide containing a ethylenically unsaturated bond such as (meth)acrylamide or N-substituted (meth)acrylamides (ex. N-alkyl (meth)acrylamide, N,N-(dialkylamino) alkyl (meth)acrylamide, N,N-dialkyl (meth)acrylamide, N,N-dialkyl (meth)acrylamide and N-dialkyl-N-dihydroxy (meth)acrylamide); aliphatic amines such as 3-dialkyl aminoalkyl amine and N,N-dialkyl alkylene diamine; and nitrogen-containing heterocyclic compounds having a ethylenically unsaturated bond such as vinyl aziridine, vinyl azetidine, vinyl dihydropyrrole, vinyl tetrahydropyrrole, vinyl pyrrole, vinyl piperidine, vinyl pyridine, vinyl pyrrolidine, vinyl quinuclidine, vinyl pyrrolidone, vinyl caprolactam, aminoalkyl pyridine and aminoalkyl pyrrolidine, and preferably a hetrocyclic compound containing nitrogen and having a ethylenically unsaturated bond such as vinyl pyridine. The terms "alkyl" and "alkylene" used to exemplify the monomer may linear or branched, substituted or unsubstituted alkyl and alkylene having 1 to 12 carbon atoms, preferably 1 to 8 carbon atoms, more preferably 1 to 4 carbon atoms, but the present invention is not limited thereto.

The random copolymer of the present invention may comprise 10 or more parts by weight, or preferably 20 or more parts by weight of the hydrophilic monomer; and up to 90 parts by weight, or preferably, up to 80 parts by weight of the hydrophobic monomer. When content of the hydrophilic monomer is less than 10 parts by weight, or content of the hydrophobic monomer is more than 90 parts by weight, the degree of exfoliation and/or dispersion into the polymer resin of the layered inorganic material may be degraded. The upper limit of the hydrophilic monomer and the lower limit of the hydrophobic monomer are not particularly limited, but these are preferably 70 parts by weight and 30 parts by weight, respectively.

The random copolymer may further comprise a monomer containing a function group with the hydrophilic and hydrophobic monomers from the viewpoint of imparting reactivity and compatibility with a polymer resin. The examples of the monomer containing a function group include, but not limited thereto, a monomer containing hydroxyl group, a monomer containing carboxy group and/or a monomer containing glycidyl group, and preferably a monomer containing glycidyl group. The examples of the monomer containing hydroxyl group includes, but not limited thereto, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth) acrylate and 2-hydroxypropyleneglycol (meth)acrylate; the examples of the monomer containing carboxy group includes, but not limited thereto, (meth)acrylic acid, 2-(meth) acryloyloxy acetic acid, 3-(meth)acryloyloxy propylic acid, 4-(meth)acryloyloxy butylic acid, acrylic acid dimer, itaconic acid, maleic acid and maleic anhydride; and the examples of the monomer containing glycidyl group includes, but not limited thereto, glycidyl (meth)acrylate.

In the present invention, the random copolymer may comprise the monomer containing functional group in an amount of 0.1 to 15 parts by weight, or preferably 1 to 10 parts by weight, relative to 100 parts by weight of the hydrophilic monomer and hydrophobic monomer in total. The contents of the monomer is less than 0.1 parts by weight, it is apprehended that dispersion between the nanocomposite and a polymer is deteriorated, and the contents of the monomer is more than 15 parts by weight, it is apprehended that exfoliation or dispersion of the layered inorganic material is decreased. In the present invention, the contents of each component comprised in the nanocomposite are not specially limited. For example, the nanocomposite may comprise the layered inorganic material in an amount of 0.1 to 80 parts by weight, preferably 1 to 60 parts by weight, relative to 100 parts by weight of total solid parts (the sum of layered inorganic material and the random copolymer). When the contents of the layered inorganic material are less than 0.1 parts by weight, it is apprehended that improvement in properties by the dispersion of the layered inorganic material is insignificant. Conversely, when the content is more than 80 parts by weight, it is apprehended that the inorganic materials are agglomerated, thereby decreasing dispersion at the nanoscale level, and reducing improvement in the properties.

The present invention also relates to a polymer composition comprising a polymer resin and the nanocomposite according to the present invention which is dispersed in the polymer resin. As described above, the nanocomposite of the present invention has excellent dispersion and miscibility into the polymer resin because of a high degree of exfoliation of the layered inorganic material. Thus, the polymer composition may maintain excellent properties including excellent mechanical and thermal characteristics, high liquid and gas permeability and low flammability. Therefore, the polymer composition of the present invention can be efficiently used for various parts for vehicle, bottles, cutoff films and/or incombustible materials.

The kind of the polymer resin included in the polymer composition is not particularly limited and the present invention may use any thermoplastic and/or thermosetting resin generally used in the art without limitation.

The thermoplastic resin may include polylactones such as poly(pivalolactone) and poly(caprolactone); polyurethanes induced from diisocyanates [ex. 1,5-naphthalene diisocyanate, p-phenylene diisocyanate, m-phenylene diisocyanate, 2,4-toluene diisocyanate, 4,4-diphenylmethane diisocyanate, 3,3' dimethyl-4,4' diphenylmethane diisocyanate, 3,3' dimethyl-4,4' biphenyl diisocyanate, 4,4' diphenyl isopropylidene diisocyanate, 3,3' dimethyl-4,4' diphenyl diisocyanate, 3,3' dimethyl-4,4' diphenylmethane diisocyanate, 3,3' dimethoxy-4,4' biphenyl diisocyanate, dianicidine diisocyanate, toluidine diisocyanate, hexamethylene diisocyanate and 4,4' diisocyanate diphenylmethane] and linear long-chain diols [ex. poly(tetramethylene adiphate), poly(ethylene adiphate), poly(1,4-butylene adiphate), poly(ethylene succinate), poly(2,3-butylene succinate) and polyether diol]; polycarbonates such as poly(methane bis(4-phenyl)carbonate), poly(1,1-ether bis (4-phenyl)carbonate), poly(diphenylmethane bis (4-phenyl) carbonate), poly(1,1-cyclohexane bis (4-phenyl)carbonate) and poly(2,2-(bis-4-hydroxyphenyl) propane)carbonate; polysulfone; polyether ether ketone; polyamides such as poly(4-aminobutyrate), poly(hexamethylene adipamide), poly(6-aminohexanoate), poly(m-xylylene adipamide), poly(p-xylylene sebacamide), poly (metaphenylene isophthalamide) and poly(p-phenylene terephthalamide); polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate), poly(p-hydroxy benzoate), poly(1,4-cyclohexylidene dimethylene terephthalate)(cis), poly(1,4-cyclohexylidene dimethylene terephthalate)(trans), polyethylene terephthalate and polybutylene terephthalate; poly(arylene oxide)s such as poly(2,6-dimethyl-1,4-phenylene oxide) and poly(2,6-diphenyl-1,1-phenylene oxide); poly(arylene sulfide) such as ploy phenylene sulfide; polyetherimide; vinyl polymers such as polyvinyl acetate, polyvinyl alcohol, polyvinyl chloride, polyvinyl butyral, polyvinylidene chloride and ethylene-vinyl acetate copolymer, and copolymers thereof; acryl-based polymers such as poly(ethyl (meth)acrylate), poly(n-butyl (meth)acrylate), poly(methyl (meth)acrylate), poly(n-propyl (meth)acrylate), poly(meth)acrylamide, poly(meth)acrylonitrile, poly((meth)acrylate), an ethylene-ethyl (meth)acrylate copolymer and an ethylene-(meth)acrylate copolymer; acrylonitrile copolymers such as poly(acrylonitrile-co-butadiene-co-styrene) and poly(styrene-co-acrylonitrile); styrene-based polymers such as polystyrene, a poly(styrene-co-maleic anhydride) polymer and its derivatives, a methyl methacrylate-styrene copolymer and a methacrylated butadiene-styrene copolymer; polyolefines such as polyethylene, polybutylene, polypropylene, chlorinated low-density polyethylene and poly(4-methyl-1-pentene); an ionomer; poly(epichlorohydrin); polysulfones such as a reaction product of a sodium salt of 2,2-bis(4-hydroxyphenyl)propane with 4,4' dichlorodiphenyl sulfone; a furan resin such as poly(furan); cellulose ester thermoplastic materials such as cellulose acetate, cellulose acetate butyrate and cellulose propionate; a protein thermoplastic material; polyarylene ester such as polyphenylene oxide; polyimide; polyvinylidene halide; aromatic polyketone; polyacetal; polysulfonate; a polyester ionomer; a polyolefine ionomer; thermoplastic elastomer polymers such as polybutadiene, polyisobutylene, an ethylene-propylene copolymer, an ethylene-propylene-diene terpolymer, a sulfonated ethylene-propylene-diene terpolymer, polychloroprene, poly(2,3-dimethylbutadiene), poly(butadiene-co-pentadiene), chlorosulfonated polyethylene, polysulfide elastic polymer, block copolymers (ex. a poly(styrene-butadiene-styrene) block copolymer; KRATON®; Shell Chemical Company) of glassy or crystalline blocks (ex. polystyrene, poly(vinyl toluene), poly(t-butyl styrene) and polyester) and elastic polymer blocks (ex. polybutadiene, polyisoprene, an ethylene-propylene copolymer, an ethylene-butylene copolymer and poly-ether ester); or fluoropolymers (ex. THV 220, THV 400G, THV 500G, THV 815, THV 610X, PVDF, PFA, HTE, ETFE and FEP (Dyneon LLC); KYNAR (Atofina Chemicals); HYLAR and HALAR ECTFE (Solvay Solexis), etc.). The thermosetting resin may include at least one selected from the group consisting of an epoxy resin; a phenoxy resin; an unsaturated polyester resin; a vinyl ester resin; an alkyd resin; an acryl resin; a one-part urethane resin; a two-part urethane resin; a cyanate resin; a phenol resin; and an aminoplast resin.

The polymer composition of the present invention may comprise 1 to 40 parts by weight of the nanocomposite with respect to 100 parts by weight of the polymer resin. When the content is less than 1 part by weight, the effect due to the addition of the nanocomposite may not be obtained, and when the content is more than 40 parts by weight, economical efficiency may be decreased.

The polymer composition of the present invention may further include at least one additive selected from the group consisting of a surfactant, a flame retardant, a filler, an ultraviolet absorbent, an antioxidant, a thickener, a coloring agent, an aromatic and an antibiotic, with the polymer resin and nanocomposite described above.

The present invention also relates to a method for preparing a polymer composition comprising: a step of preparing a nanocomposite by mixing a layered inorganic material and a random copolymer containing a hydrophilic monomer and a hydrophobic monomer; and a step of mixing the nanocomposite and a polymer resin.

In the present invention, the first step is to prepare a nanocomposite by mixing a layered inorganic material and a random copolymer. Here, the particular kinds of the layered inorganic material available for the present invention are listed above. The random copolymer may be prepared through conventional radical polymerization such as random copolymerization using the above-mentioned monomer.

The random copolymer may used in the first step of the present invention further comprise the monomer containing functional group with the hydrophilic and hydrophobic monomer.

The method of mixing the layered inorganic material and the random copolymer is not particularly limited, and may be accomplished by a common method known in the art, for example, solution blending or melt blending. In the solution blending, an aqueous solvent, an organic solvent or a combination thereof may be used as solvent, and the combination of an aqueous solvent and an organic solvent is preferable. The solvent functions to help dispersion of the layered inorganic material into the random copolymer. Accordingly, in the present invention, it is desirable to use a solvent capable of expanding the inorganic material and/or the copolymer, but is not limited thereto; Also, in the present invention, when the melt blending is used, the mixing of the inorganic material and the random copolymer may be performed by melt mixing and kneading using a common single- or twin-screw extruder, stirrer or kneader. In the step, the nanocomposite may be prepared by mixing a copolymer and an inorganic material in the presence of the solvent mentioned above, or by directly blending these materials in melted form to effectively mix them.

During the step, the layered inorganic material is intercalated and/or exfoliated by the random copolymer. A person having ordinary skill in the art can easily control (a) degree(s) of intercalation and/or exfoliation by adjusting parameters including concentrations of each elements, compositions, a pressure in mixing, a temperature profile in the process (isothermal or increasing type), an addition order of materials, (an) intensity and/or rate of applied sheer stress, and durability of a mixing process.

In the second step, the nanocomposite prepared by the above method is dispersed into a polymer resin. The nanocomposite may be dispersed by extruding, stirring and/or kneading in the presence or absence of an appropriate solvent, but the present invention is not limited thereto.

In one aspect of the present invention, the nanocomposite and/or the polymer copolymer may be mixed in a granular or molten form. Also, the nanocomposite may also be mixed with a molten-form polymer resin in a blending device such as a twin-screw extruder, and then the mixture may be extruded and solidified.

MODE FOR INVENTION

Hereinafter, the present invention will be described in more detail with reference to examples, but the scope of the present invention is not limited to the following examples.

PREPARATION EXAMPLE 1

Preparation of Random Copolymer

By common radical polymerization disclosed literature (e.g., Alberda van Ekenstein et al., *Macromolecules* 2000, 33, 3752), Random copolymers containing 25 wt % and 56 wt % of 2-vinylpyridine (hereinafter, referred to as "poly(S-ran-2VP)-25" and "poly(S-ran-2VP)-56" respectively), respectively, were prepared using styrene as a hydrophobic monomer and 2-vinyl pyridine as a hydrophilic monomer. To be specific, styrene (Aldrich Chemical) and 2-vinyl pyridine (Aldrich Chemical) which were distilled and purified in vacuum were used as monomers, and 2,2-azobis(isobutyronitrile) (AIBN) recrystallized from acetone was used a polymerization initiator. 75 mL of dry toluene (solvent) was added to each flask to dissolve 15.7 mL (or 9.2 mL) of the purified styrene and 5.3 mL (or 11.8 mL) of the purified 2-vinyl pyridine. Subsequently, gas was removed from each flask, the flasks were heated to 60, and then 0.25 parts by weight (0.04785 gm) of AIBN dissolved in toluene with respect to 100 parts by weight of the monomers was added to each flask. Reaction was maintained for about 16 hours to achieve about 10% of conversion. Hydroquinone was added to terminate polymerization, and the prepared copolymers were precipitated in hexane, filtered and then dried at 40 in vacuum. Characteristics of the synthesized copolymers were analyzed and are listed in Table 1.

TABLE 1

| | 2VP content (wt %) | Mw[1] | Mn | $T_g$(° C.) |
|---|---|---|---|---|
| Poly(S-ran-2VP)-25 | 25 | $5.53 \times 10^4$ | $4.02 \times 10^4$ | 93 |
| Poly(S-ran-2VP)-56 | 56 | $6.31 \times 10^4$ | $5.40 \times 10^4$ | 93 |

[1]measured based on polystyrene using gel permeation chromatography

PREPARATION EXAMPLE 2

Preparation of Random Copolymer

By using styrene as hydrophobic monomer, 2-vinyl pyridine as hydrophilic monomer and glycidyl methacrylate (GMA) as monomer containing a functional group, random copolymers containing 22 to 25 wt % of 2-vinyl pyridine and 4 to 12 wt % of glycidyl methacrylate were prepared through common polymerization. To be specific, styrene (Aldrich Chemical), 2-vinyl pyridine (Aldrich Chemical) and glycidyl methacrylate which were distilled and purified in vacuum were used as monomers, and 2,2-azobis(isobutyronitrile) (AIBN) recrystallized from acetone was used a polymerization initiator. 75 mL of dry toluene (solvent) was added to each flask to dissolve the purified styrene, 2-vinyl pyridine and glycidyl methacrylate. Subsequently, gas was removed from each flask, the flasks were heated to 60, and then 0.25 parts by weight (0.04785 gm) of AIBN dissolved in toluene with respect to 100 parts by weight of the monomers was added to each flask. Reaction was maintained for about 24 hours to achieve about 30 to 40% of conversion. Hydroquinone was added to terminate polymerization, and the prepared copolymers were precipitated in hexane, filtered and then dried at 40 in vacuum. Characteristics of the synthesized copolymers were analyzed and are listed in Table 2.

TABLE 2

| | 2VP content (wt %) | GMA content (wt %) | Mw[1] | PDI |
|---|---|---|---|---|
| Poly(S-ran-2VP)-24-GMA-4 | 24 | 4 | $5.28 \times 10^4$ | 2.67 |
| Poly(S-ran-2VP)-23-GMA-8 | 23 | 8 | $4.80 \times 10^4$ | 2.42 |
| Poly(S-ran-2VP)-22-GMA-12 | 22 | 12 | $4.47 \times 10^4$ | 2.32 |

[1]measured based on polystyrene using gel permeation chromatography

EXAMPLES 1 and 2

Nanocomposites were prepared using a natural clay (montmorillonite MMT; Southern Clay Products) and an organoclay (Cloisite 30B; Southern Clay Products). A chemical structure of a surfactant (MT2EtOH) present on a surface of the organoclay is represented by Formula 1:

[Formula 1]

In Formula 1, an $N^+$ ion is quaternary ammonium salt, T is tallow consisting of 65% C18, 30% C16 and 5% C14.

A content of the surfactant present on the surface of the organoclay (Cloisite 30B) was 26 wt % (90 meq/100 g), and the $Na^+$ ions in the natural clay (montmorillonite MMT) were 100% exchanged. Using the clays and the random copolymers (poly(S-ran-2VP)-25 (Example 1), poly(S-ran-2VP)-56 (Example 2) prepared in Preparation Example 1, nanocomposites were prepared by solution blending. To be specific, each random copolymer was melted in a mixed solution of THF and water (90:10 v:v), and then the clay was slowly added to the solution while stirring quickly. This process was performed for 30 minutes at room temperature and then the solution was stirred at a constant rate, thereby slowly evaporating the solvent from the mixture, for 2 days. Subsequently, the nanocomposite was completely dried in a vacuum oven at a temperature higher than the melting point of the solvent, and then dried again at a temperature about 20 higher than the glass transition temperature ($T_g$) of the copolymer, until weight variation was no longer detected.

EXAMPLES 3 TO 5

The same layered inorganic material as used in Example 1 and 2, and the random copolymers (poly(S-ran-2VP)-24-GMA-4 (Example 3), poly(S-ran-2VP)-23-GMA-8 (Example 4), poly(S-ran-2VP)-22-GMA-12 (Example 5)) prepared in preparation example 2 were used to prepare nanocomposites.

Using the clays and the random copolymers prepared in Preparation Example 1, nanocomposites were prepared by solution blending. To be specific, each random copolymer was melted in a mixed solution of THF and water (90:10 v:v), and then the clay was slowly added to the solution while stirring quickly. This process was performed for 30 minutes at room temperature and then the solution was stirred at a constant rate, thereby slowly evaporating the solvent from the mixture, for 2 days. Subsequently, the nanocomposite was completely dried in a vacuum oven at a temperature higher than the melting point of the solvent, and then dried again at a temperature about 20 higher than the glass transition temperature ($T_g$) of the copolymer, until weight variation was no longer detected.

TEST EXAMPLE 1

Transmission Electron Microscopy (TEM) Analysis for Nanocomposite

The nanocomposites prepared in Example 1 to 3 were stained with iodine vapor to take a TEM image at room temperature. To be specific, the ultrathin sectioning (50-70 nm) was performed via cryogenic ultra-microtomy at room temperature for nanocomposite samples, using a diamond knife on the Reichert Ultracut S low-temperature sectioning system. A transmission electron microscope (JEM1200EX II, JEOL) operated at 120 kV was used to record TEM images.

Figure 1:
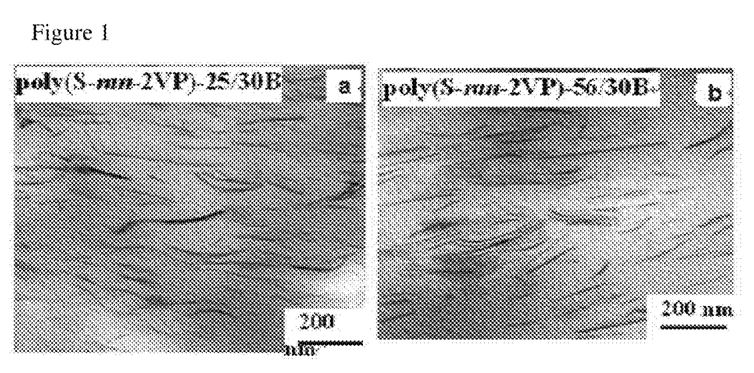
FIGS. 1 and 2 are TEM images of nanocomposites prepared in examples of the present invention.
Figure 2:
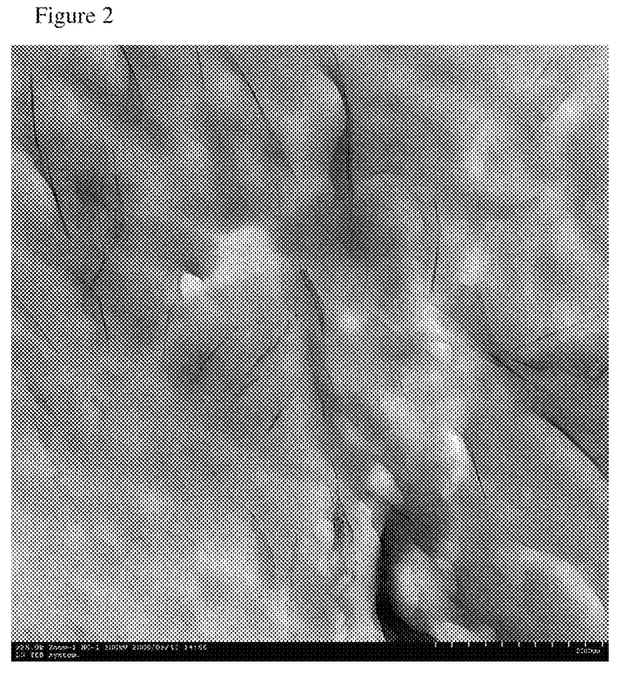

FIG. 1 shows TEM images of the nanocomposites in Example 1 and 2, and FIG. 2 shows TEM image of the nanocomposite in Example 3. Referring to FIG. 1, it can be noted that the poly(S-ran-2VP)/Cloisite 30B nanocomposite exhibits an excellent dispersion characteristic (high degree of exfoliation), and particularly, the dispersion characteristic is significantly improved as the content of 2-vinyl pyridine is increased. The increased degree of exfoliation according to the increased content of a hydrophilic monomer is opposite to the result obtained from a conventional nanocomposite based on a block copolymer. It may be concluded that this result is attributable to the following reasons. (1) In the random copolymer, the pyridine rings distributed randomly in the polymer chains would have lesser chances of intramolecular interaction (the formation of self-association) as compared to the situations in block copolymer in which the pyridine rings are regularly placed along the chain of P2VP block. (2) As the amount of 2-vinylpyridine in the random copolymer is increased, more pyridine rings in the polymer chain will become available to interact with the positively charged $N^+$ ion in the surfactant on the organoclay (Cloisite 30B), giving rise to enhanced ion-dipole interaction and thus higher degree of exfoliation of organoclay aggregates.

TEST EXAMPLE 2

X-ray Diffraction (XRD) Analysis for Nanocomposite

Using a Rigaku X-ray generator operated at 40 kV and 40 mA, XRD patterns were obtained to determine the mean interlayer spacing of the (001) plane ($d_{001}$) for the various nanocomposites prepared in Example. The X-ray beam with a wavelength ($\lambda$) of 0.1542 nm was monochromatized to $CuK_\alpha$, with a graphite crystal. The range of $2\theta$ scanning of X-ray intensity employed was 1.5-10°.

Figure 3:
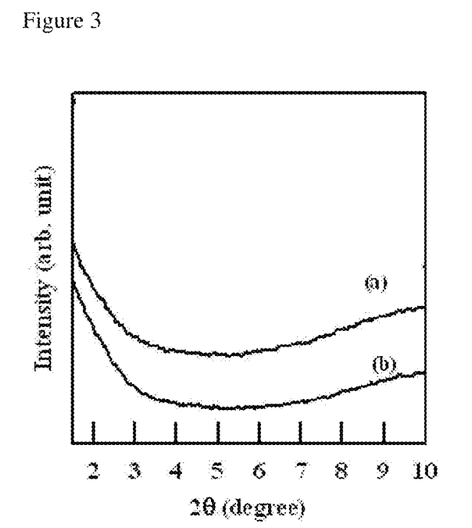
FIG. 3 is XRD patterns of the nanocomposites prepared in examples of the present invention.

FIG. 3 shows XRD patterns of the nanocomposites based on the Examples 1 and 2. FIG. 3 shows featureless patterns. Thus we conclude that the XRD patterns given in FIG. 3 are consistent with the TEM images of the same nanocomposites in Example 1 to 2.

The invention claimed is:

1. A nanocomposite comprising:
a layered inorganic material intercalated or exfoliated by a random copolymer, the random copolymer prepared from a mixture comprising:
  90 or less parts by weight of a hydrophobic monomer that is at least one selected from the group consisting of ethylenically unsaturated hydrocarbon; halogenated olefin, and alkyl (meth)acrylate;
  10 or more parts by weight of a hydrophilic monomer that is nitrogen-containing heterocyclic compound having ethylenically unsaturated bond; and
  0.1 and 15 parts by weight of a monomer containing a glycidyl group, and
wherein the layered inorganic material comprises a plurality of platelets having a thickness of 0.5 and 5 nm, a length of 25 to 2000 nm and an aspect ratio of 50 to 2000, wherein a distance between the platelets comprised in the layered inorganic material is 1 nm or more; and
wherein the layered inorganic material is an organoclay in which a surfactant is present on a surface.

2. The nanocomposite according to claim 1, wherein the layered inorganic material comprises at least one selected from the group consisting of a natural layered silicate and a synthetic layered silicate.

3. The nanocomposite according to claim 1, wherein the organoclay is modified by at least one intercalant selected from the group consisting of a neutral organic compound and an ionic organic compound.

4. The nanocomposite according to claim 3, wherein the neutral organic compound comprises monomeric, oligomeric or polymeric compound of at least one selected from the group consisting of amide, ester, lactam, nitrile, urea, carbonate, phosphate, phosphonate, sulfate, sulfonate and nitro compounds; and the ionic organic compound comprises a cationic surfactant.

5. The nanocomposite according to claim 1, wherein a reactivity ratio ($r_1$) of the hydrophilic monomer given by Formula (1) and a reactivity ratio ($r_2$) of the hydrophobic monomer given by Formula (2) satisfy the conditions given by Formulae (3) and (4):

$$r_1 = k_{11}/k_{12}; \quad \text{Formula (1)}$$

$$r_2 = k_{22}/k_{21}; \quad \text{Formula (2)}$$

$$r_1 - r_2 \geq 0.5; \quad \text{Formula (3)}$$

$$[r_1 > 1 \text{ and } r_2 < 1] \text{ or } [r_1 < 1 \text{ and } r_2 > 1], \quad \text{Formula (4)}$$

wherein $k_{11}$ is a reaction rate constant of a hydrophilic radical ($M_1$.) and a hydrophilic monomer ($M_1$), $k_{12}$ is a reaction rate constant of a hydrophilic radical ($M_1$.) and a hydrophobic monomer ($M_2$), $k_{21}$ is a reaction rate constant of a hydrophobic radical ($M_2$.) and a hydrophilic monomer ($M_1$), and $k_{22}$ is a reaction rate constant of a hydrophobic radical ($M_2$.) and a hydrophobic monomer ($M_2$).

6. The nanocomposite according to claim 1, wherein the hydrophobic monomer is ethylenically unsaturated hydrocarbon.

7. The nanocomposite according to claim 1, wherein the layered inorganic material is comprised in an amount of 0.1 to 80 parts by weight, based on total weight of the nanocomposite.

8. A polymer composition comprising:
a polymer resin; and
the nanocomposite according to claim 1, the nanocomposite being dispersed in the polymer resin.

9. The polymer composition according to claim 8, wherein the polymer resin comprises at least one selected from the group consisting of thermoplastic resin and a thermosetting resin.

10. The polymer composition according to claim 8, wherein the nanocomposite is comprised in an amount of 1 to 40 parts by weight, relative to 100 parts by weight of the polymer resin.

11. The nanocomposite according to claim 3, wherein the intercalant is a neutral organic compound.

12. The nanocomposite according to claim 1, wherein a distance between the platelets comprised in the layered inorganic material is 3 nm or more.

13. The nanocomposite according to claim 1, wherein the random copolymer is prepared from a mixture comprising 20 or more parts by weight of the hydrophilic monomer.

14. The nanocomposite according to claim 1, wherein the random copolymer is prepared from a mixture comprising 1 to 10 parts by weight of the monomer containing a glycidyl group.

15. The nanocomposite according to claim 14, wherein the random copolymer is prepared from a mixture comprising 20 or more parts by weight of the hydrophilic monomer and 80 or less parts by weight of the hydrophobic monomer.

* * * * *